US012644771B2

(12) United States Patent
Marcinuk et al.

(10) Patent No.: US 12,644,771 B2
(45) Date of Patent: Jun. 2, 2026

(54) COMPACT APPARATUS FOR NON-CONTACT TEMPERATURE SENSING OF ROTATING ELEMENTS

(71) Applicant: BAE SYSTEMS Information and Electronic Systems Integration Inc., Nashua, NH (US)

(72) Inventors: Adam J. Marcinuk, Lyndeborough, NH (US); William A. Porter, Pembroke, NH (US); Ryan P. Closs, Nashua, NH (US); Michael T. Salerni, Bedford, NH (US); Gordon E. Garvin, Hillsborough, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 331 days.

(21) Appl. No.: 18/608,248

(22) Filed: Mar. 18, 2024

(65) Prior Publication Data

US 2025/0290801 A1 Sep. 18, 2025

(51) Int. Cl.
| | |
|---|---|
| G01J 5/00 | (2022.01) |
| G01J 1/04 | (2006.01) |
| G01J 5/02 | (2022.01) |
| G01J 5/53 | (2022.01) |

(52) U.S. Cl.
CPC ............ G01J 5/0022 (2013.01); G01J 5/026 (2013.01); G01J 1/04 (2013.01); G01J 1/0448 (2013.01); G01J 5/53 (2022.01)

(58) Field of Classification Search
CPC .......... G01J 1/04; G01J 1/0407; G01J 1/0448; G01J 5/0879; G01J 5/0022; G01J 5/047; G01J 5/53; G01J 5/532
See application file for complete search history.

(56) References Cited

U.S. PATENT DOCUMENTS 3,350,562 A * 10/1967 Flint ..................... G01J 5/0805
250/236

FOREIGN PATENT DOCUMENTS

DE 102006020514 A1 * 11/2007 ............. B22D 46/00
DE 102024125496 A1 * 3/2026 ........... B21B 38/006

OTHER PUBLICATIONS

Computer translation of DE_102024125496_A1 (Year: 2026).*
Computer translation of DE_102006020514_A1 (Year: 2026).*

* cited by examiner

*Primary Examiner* — Randy W Gibson
(74) *Attorney, Agent, or Firm* — Maine Cernota & Curran

(57) ABSTRACT

An apparatus for non-contacting measurement of the temperatures of rotatable elements, such as prism elements of a Risley prism assembly, includes IR emissive patches applied to radially outward facing surfaces of the rotatable elements, reflective surfaces configured to axially reflect black body IR radiation emitted by the patches, IR sensors located behind the rotatable elements and configured to sense the reflected black body radiation, and a controller configured to receive data from the IR sensors and determine therefrom the temperatures of the rotatable elements. In embodiments, none of the IR sensors extends radially beyond a housing of the rotatable elements, and in some embodiments the IR sensors do not extend radially beyond a diameter of a largest of the rotatable elements. The apparatus can further include patches oriented axially rearward and associated IR sensors.

20 Claims, 16 Drawing Sheets

COMPACT APPARATUS FOR NON-CONTACT TEMPERATURE SENSING OF ROTATING ELEMENTS

FIELD

The disclosure relates to apparatus and methods for measurement of the temperatures of rotatable elements, and more particularly to non-contact temperature measurements of rotatable elements such as the rotatable prism elements of a Risley prism assembly optical pointing device.

BACKGROUND

Measurement in near-real time of the temperature of a rotating element, or the temperatures of a plurality of elements rotating about a common axis, can be problematic, especially when space is at a premium, and/or access to the rotatable elements is limited. For example, for high precision Risley pointing systems it can be advantageous to measure the temperatures of each of the rotatable Risley prisms to enable compensation for temperature variations of the prism refraction angles. However, if a Risley pointing system is implemented in a limited space, for example in an unmanned aerial vehicle (UAV) or satellite, then it can be important to avoid attaching temperature sensors and associated slip rings, and/or other volume-consuming temperature measurement apparatus, to the Risley prism elements.

What is needed, therefore, is a system configured for measuring the temperatures in near-real time of one or more elements of an apparatus that are rotatable about a common axis, such as the prism elements of a Risley prism assembly, wherein the temperature measurement system requires only a minimal increase in the size of the apparatus to which it is applied and the space that the apparatus occupies.

SUMMARY

The present disclosure is a system configured for measuring the temperatures in near-real time of one or more elements of an apparatus that are rotatable about a common axis, such as the prism elements of a Risley prism assembly, wherein the temperature measurement system requires only a minimal increase in the size of the apparatus to which it is applied and the space that the apparatus occupies. In embodiments, the disclosed temperature measurement system requires little or no increase to the diameter of apparatus to which it is applied, but may extend slightly rearward of the element rotating apparatus.

The disclosed system includes a first rotatable element, the first rotatable element that is rotatable about a rotation axis within a fixed housing; a first IR emissive patch applied to a radially outward facing surface of the first rotatable element, the first IR emissive patch being configured to emit first black body IR radiation radially outward from the first rotatable element, a first IR reflective surface positioned such that when the first IR emissive patch is in radial alignment with the first IR reflective surface, the first black body IR radiation is reflected axially thereby, a first IR sensor fixed to the housing and positioned axially behind the first rotatable element, the first IR sensor being configured to sense the axially reflected first black body IR radiation and to generate first sensing data therefrom when the first IR reflective surface is radially aligned with the first IR emissive patch and axially aligned with the first IR sensor, and a controller configured to receive first sensing data from the first IR sensor and to determine therefrom a temperature of the first rotatable element. The first reflective surface can be fixed to the housing or to the first rotatable element.

Embodiments further include a second rotatable element that is rotatable about the rotation axis within the fixed housing, a second IR emissive patch applied to an outward facing surface of the second rotatable element, the second IR emissive patch being configured to emit second black body IR radiation radially outward from the second rotatable element: a second IR reflective surface positioned such that when the second IR emissive patch is in radial alignment with the second IR reflective surface, the second black body IR radiation is reflected axially thereby, the apparatus being configured to generate second sensing data characterizing the second black body IR radiation, and the controller being configured to receive the second sensing data and to determine therefrom a temperature of the second rotatable element.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a system configured for measuring the temperatures in near-real time of one or more elements of an apparatus that are rotatable about a common axis, such as the prism elements of a Risley prism assembly, wherein the temperature measurement system requires only a minimal increase in the size of the apparatus to which it is applied and the space that the apparatus occupies.

Attachment of temperature sensors, such as thermocouples, to rotatable elements is not always desirable or practical, at least in part because attaching sensors can require implementation of a slip ring or similar mechanism to transmit the electrical signals from the sensors through the rotating structure to a controller. As a result, the size of the assembly is increased, which is not acceptable for many applications due to size and space constraints. Furthermore, for apparatus that requires a high degree of rotational stability, implementing a slip ring can introduce additional friction, resulting in an increased mechanical "jitter" of the rotatable elements.

In contrast, embodiments of the disclosed temperature measurement system require little or no increase of the diameter of the apparatus to which it is applied, although some embodiments extend slightly rearward of the apparatus.

The present disclosure is sometimes described in the context of a Risley prism assembly. However, it will be clear to those of skill in the art that the present disclosure is applicable to other types of apparatus for which the temperatures of one or more coaxial, rotatable elements must be measured without substantially increasing the diameter of the apparatus.

Many optical systems require a "pointer" to direct light from a selected location or region within a field of view to a "target," such as a camera, that is within or proximate the optical system, or to direct light such as a laser beam from a proximate laser to a more distant field of view, where the terms "pointer" and "pointing system" are used herein interchangeably. For example, a laser targeting system may require a pointer to establish and maintain the illumination of a target by a laser beam, a satellite may require a pointing system to direct light from a desired region of the earth to an internal camera, or a node in a laser communication system may require a dual pointing system to both direct message-encoded laser beams from its transmitter to other nodes, and to direct laser beams from other nodes into its message receiving system.

Figure 1A:
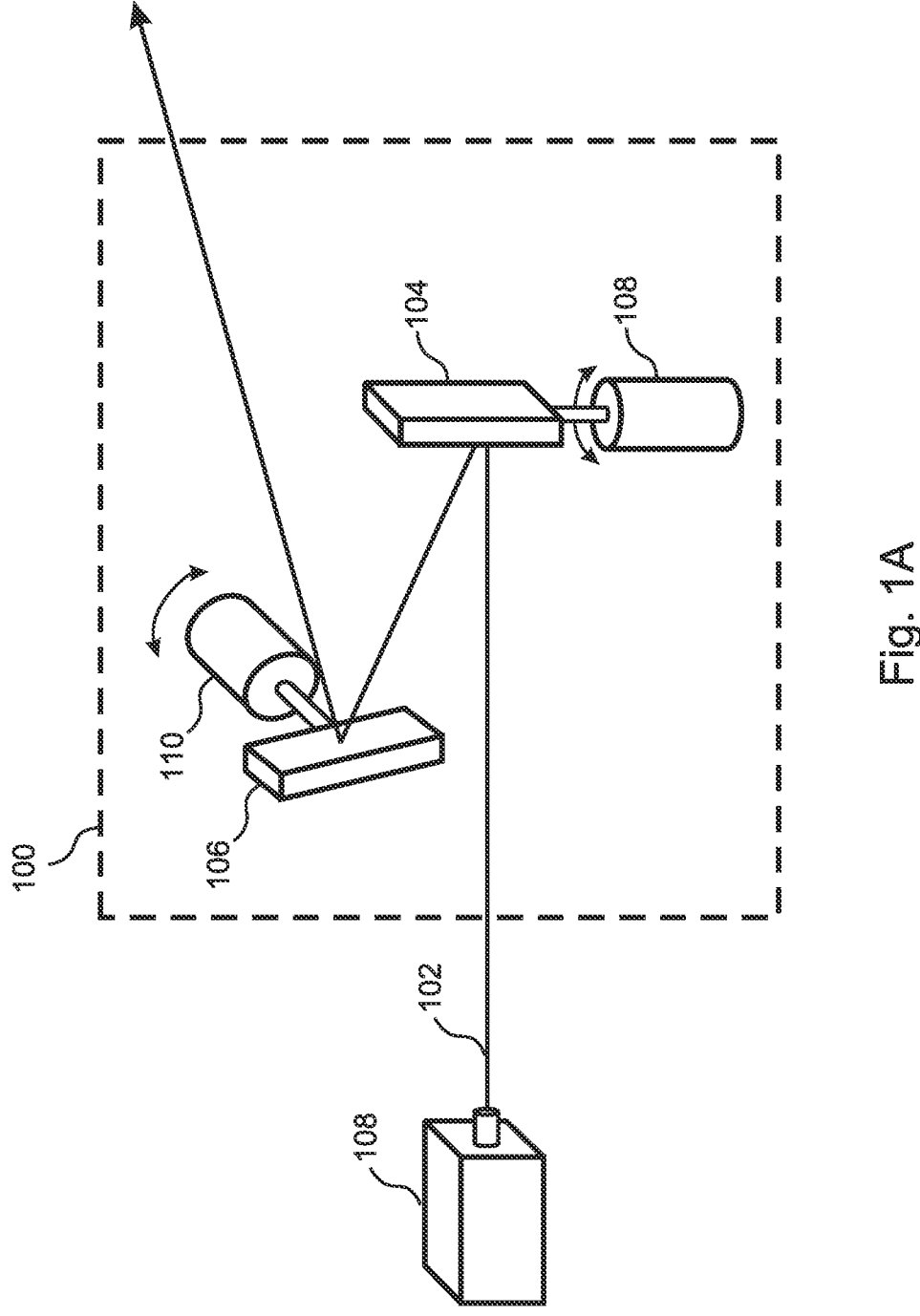
FIG. 1A is a simplified perspective view of a gimbal pointing system.

With reference to FIG. 1A, one common type of pointer that is implemented in many optical systems is a "gimbal" pointer 100, which directs light 102 using a pair of orthogonal IR reflective mirrors 104, 106 driven by servo-motors 108, 110. However, gimbal pointers tend to have space and aperture requirements that are excessive for some applications, such as in aircraft and satellites. For example, if a gimbal pointer is implemented as part of a camera system on an aircraft, it can be impractical to provide a sufficiently large aperture, i.e. a large enough "window," that is flush with the fuselage of the aircraft. Instead, it is often necessary to provide a transparent "bubble" or dome into which one, or both, of the mirrors 104, 106 of the gimbal pointer can extend beyond the fuselage to obtain a sufficient field of view. This approach can be undesirable, in that a bubble or dome extending beyond the fuselage may interfere with the aerodynamics or other properties of the aircraft.

Figure 1B:
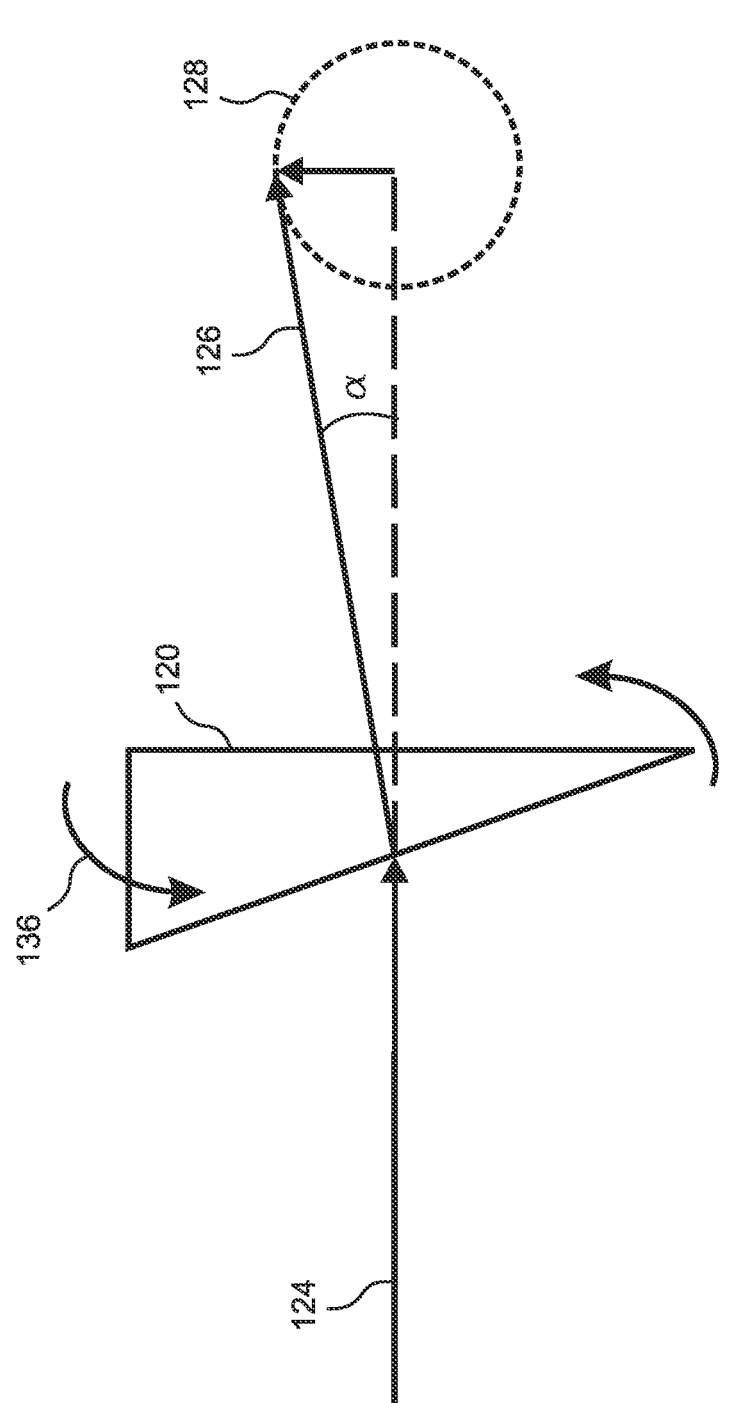
FIG. 1B is simplified diagram that illustrates refraction of a laser beam by a prism.
Figures 1C, 1D:
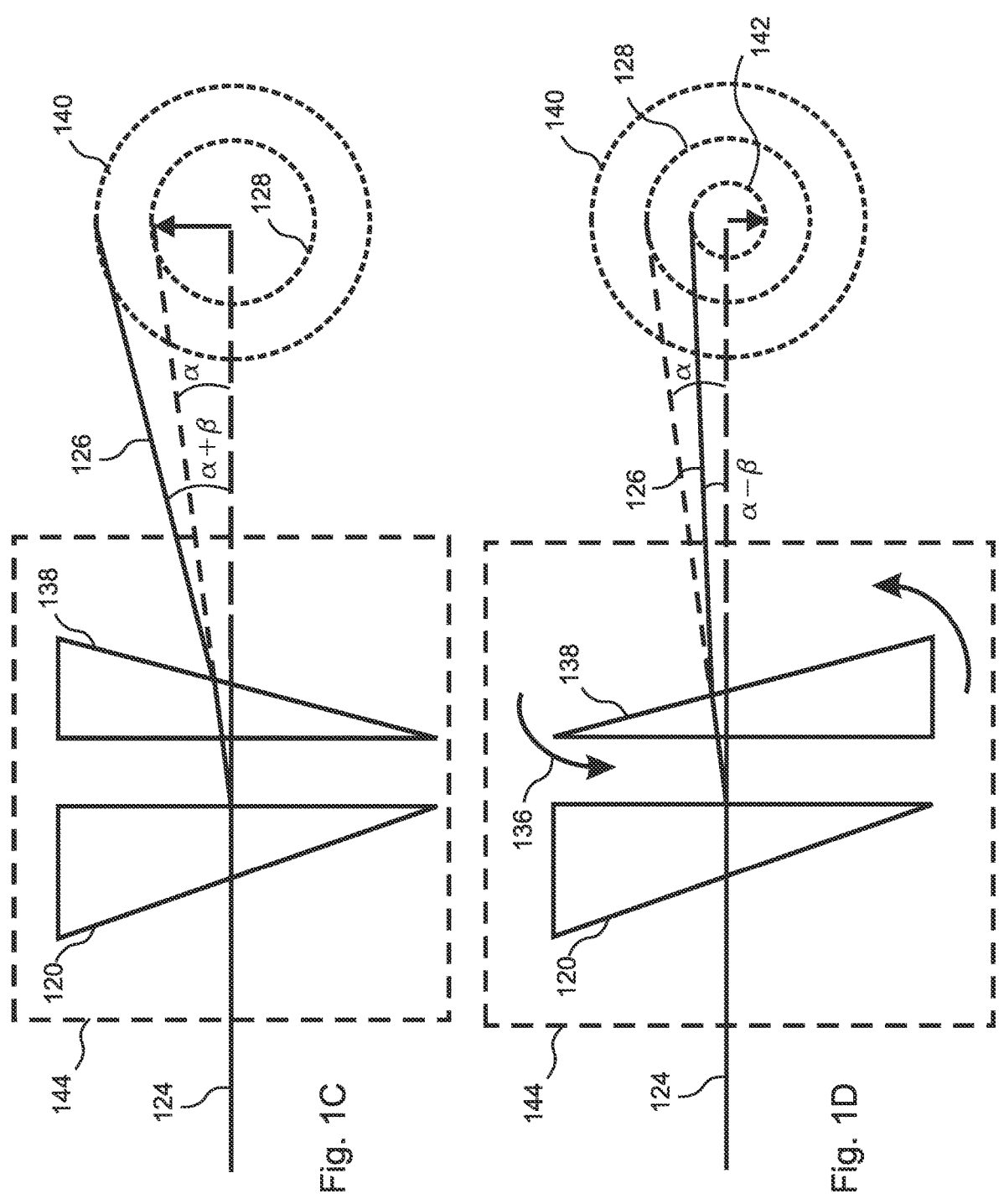
FIG. 1C is a simplified diagram that illustrates refraction of a laser beam at a maximum refraction angle by two rotatable prisms of a Risley prism assembly.
FIG. 1D is a simplified diagram that illustrates refraction of a laser beam at a minimum refraction angle by two rotatable prisms of a Risley prism assembly.

Another approach is to implement a Risley pointer, which does not redirect light by reflecting it, but instead refracts the light by passing it through a "Risley" prism assembly (RPA). FIGS. 1B through 1D illustrate the fundamentals of a Risley prism assembly 144 by presenting an example where an incoming laser beam 124 enters the RPA 144 along its central axis, and is refracted into an outgoing beam 126. FIG. 1B illustrates refraction by a single wedge prism 120 of the incoming laser beam 124 into the outgoing beam 126, where the two beams 124, 126 differ in direction by an angle α. By rotating 136 the prism 120 about the axis of the incoming beam 124, the direction of the outgoing beam 126 can be changed, with the family of all possible output beams 126 forming a surface of a cone. If the outgoing beam 126 impinges on a target, rotation of the prism 120 causes the impact point of the beam 126 to vary about a circle 128 on the target. It will be noted that the pointing circles 128, 140, 142 in FIGS. 1B through 1D are presented as if the outgoing beam 126 were directed onto the page, while other elements in the drawings are presented with the light traveling in the plane of the page.

Of course, the single, rotatable prism 120 of FIG. 1B is not sufficient by itself to enable the RPA to direct light to or from any desired location or region in a field of view (FOV). Instead, with reference to FIGS. 1C and 1D, an RPA combines at least two prisms 120, 138 that are both independently rotatable about the axis of the incoming beam 124. In FIG. 1C, the two prisms 120, 138 are aligned, such that the refraction of the incoming beam 124 by the two prisms 120, 138 is cumulative, whereby the total refraction angle of the outgoing beam 126 is the sum of the separate refraction angles, i.e. α+β. In FIG. 1D the second prism 138 has been rotated such that the refraction of the incoming beam 124 by the two prisms 120, 138 is subtractive, whereby that the total refraction angle of the outgoing beam 126 is the difference between the separate refraction angles of the prisms 120, 138, i.e. α−β.

By rotating both of the prisms 120, 138, the impact point of the outgoing beam 126 on a target can be directed anywhere within an annular region bounded by a maximum deflection circle 140 corresponding to α+β and a minimum deflection circle 142 corresponding to α−β. Typically, two prisms 120, 138, or two assemblies of prisms, having the same dispersion angle α are implemented in an RPA, so that the minimum deflection circle 142 is reduced to a central point, allowing the output beam 126 to be directed within the disk defined by the maximum deflection circle 140.

The term "prism element" is used herein to refer to a group of one or more prisms that are fixed to each other and rotate as a unit. In the simplified illustrations of FIGS. 1C and 1D, each of the prism elements is a single prism 120, 138, and the two prisms 120, 138 are of equal diameter. However, a simple Risley prism assembly as illustrated in FIGS. 1C and 1D may not be suitable for some applications, because the prisms 120, 138 are inherently dispersive, or "chromatic," in that they refract different wavelengths of light at different angles. Instead, with reference to FIG. 1E, an achromatic RPA in which each of the prism elements 158, 160 includes a plurality of prisms 150, 152, and 154, 156 can be implemented to achieve refraction angles that are substantially independent of wavelength. An example is the achromatic RPA disclosed in U.S. Pat. No. 9,140,901, also by the present Applicant, which is incorporated herein by reference in its entirety for all purposes.

Figure 1E:
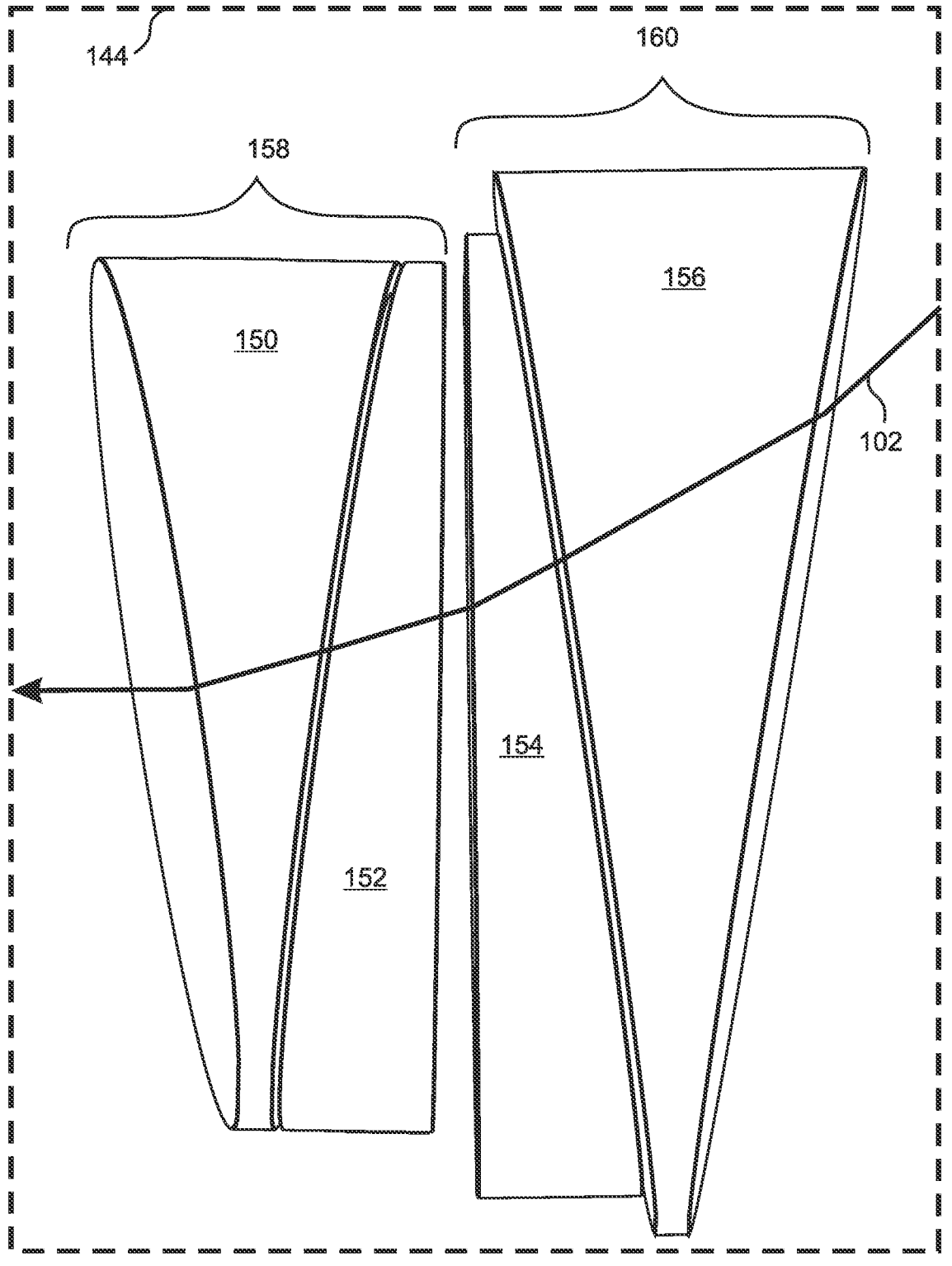
FIG. 1E is a simplified diagram that illustrates refraction of a laser beam by two rotatable prism elements of a Risley prism assembly, each of which includes two prisms fixed to each other.

In the example of FIG. 1E, each of the prism elements 158, 160 is a pair of prisms 150, 152 and 154, 156. In general, the prisms 150, 152, 154, 156 can have different diameters and different numbers of prisms, and the prisms can be made from different materials. In the example of FIG. 1E, the light 102 originates from a relatively distant FOI to the right of the RPA 144, and is refracted toward a relatively close destination to the left of the RPA 144, such as a camera. It will be noted that the rotatable prism element 160 on the righthand side is larger in diameter than the rotatable prism element 158 on the lefthand side. This is often the case, because, due to the thickness of the prisms, there is inherent "beam walk," i.e. lateral deviation away from the central axis. As a result, to prevent vignetting, or "clipping," at the outer aperture, the diameter of the prism element 160 needs to be increased. Accordingly, for a given incoming or outgoing beam diameter, the diameter of the outward-facing prism 160, i.e. the prism element facing a more distant FOI, will need to be larger than the inward-facing prism element 158.

An RPA 144 can be an attractive choice for a beam director in some applications, such as for an aircraft, because an RPA 144 can be conformally mounted on the aircraft skin or on a pod surface for optimal aero-optic considerations with minimal boundary layer turbulence. Furthermore, Risley pointers 144 typically consume less space and require smaller apertures than gimbal pointers 100.

Figure 2A:
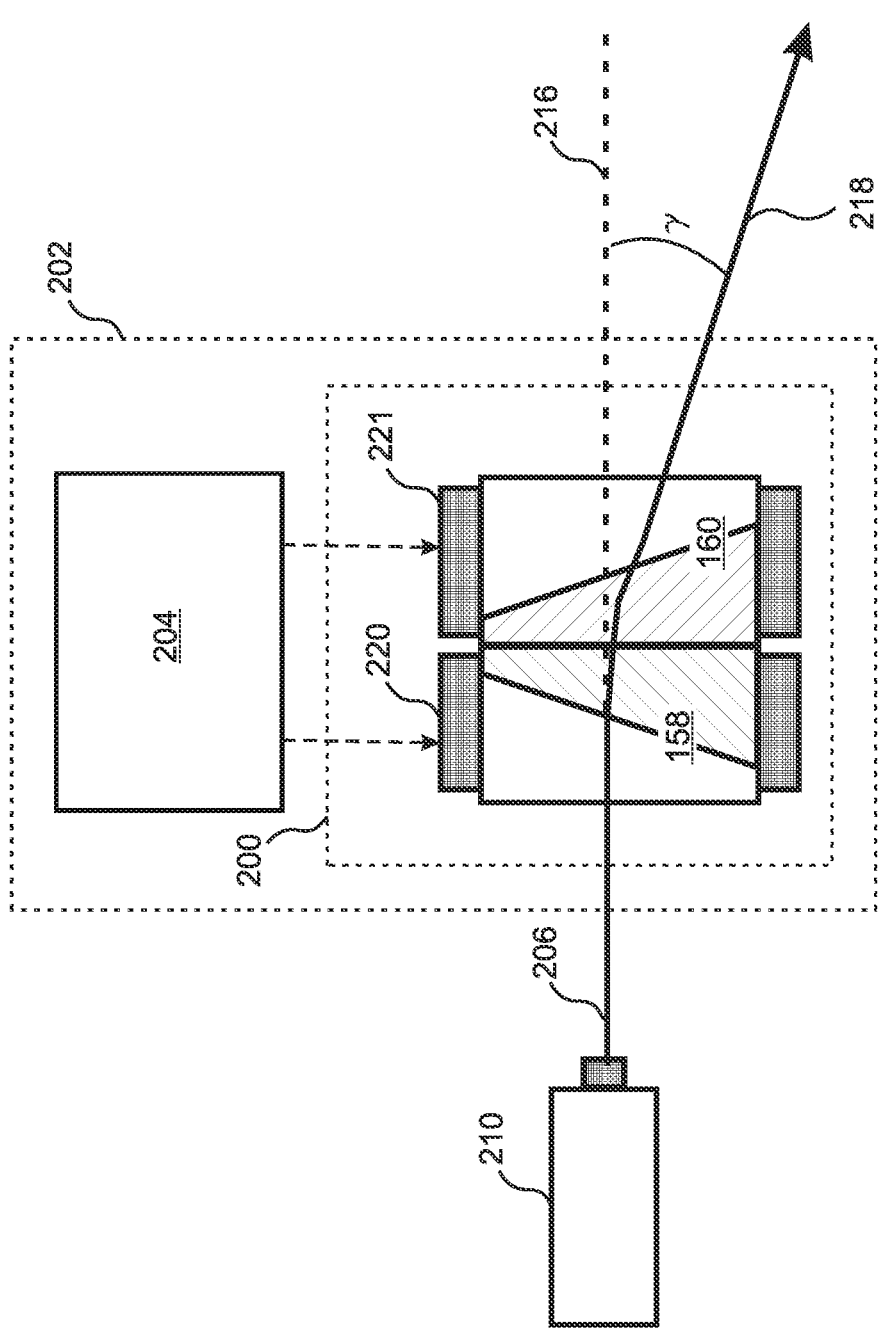
FIG. 2A is a block diagram of a Risley prism pointing system according to an embodiment of the present disclosure in which the RPA is included in a laser targeting system.

With reference to FIG. 2A, for some applications that implement a Risley pointing system 202, for example, a laser targeting system, a single beam of light 206 from a laser 210 enters the RPA 200 along the central rotation axis 216 and emerges from the RPA 200 in a desired pointing direction 218 as directed by a controller 204.

In one example, the controller 204 comprises at least one processor with memory and having communications capability to communicate at least with the motors 220, 221 that rotate the prism elements 158, 160, and in embodiments with other apparatus from which it receives pointing instructions, such as a satellite tracking system or a weapons targeting system.

Figure 2B:
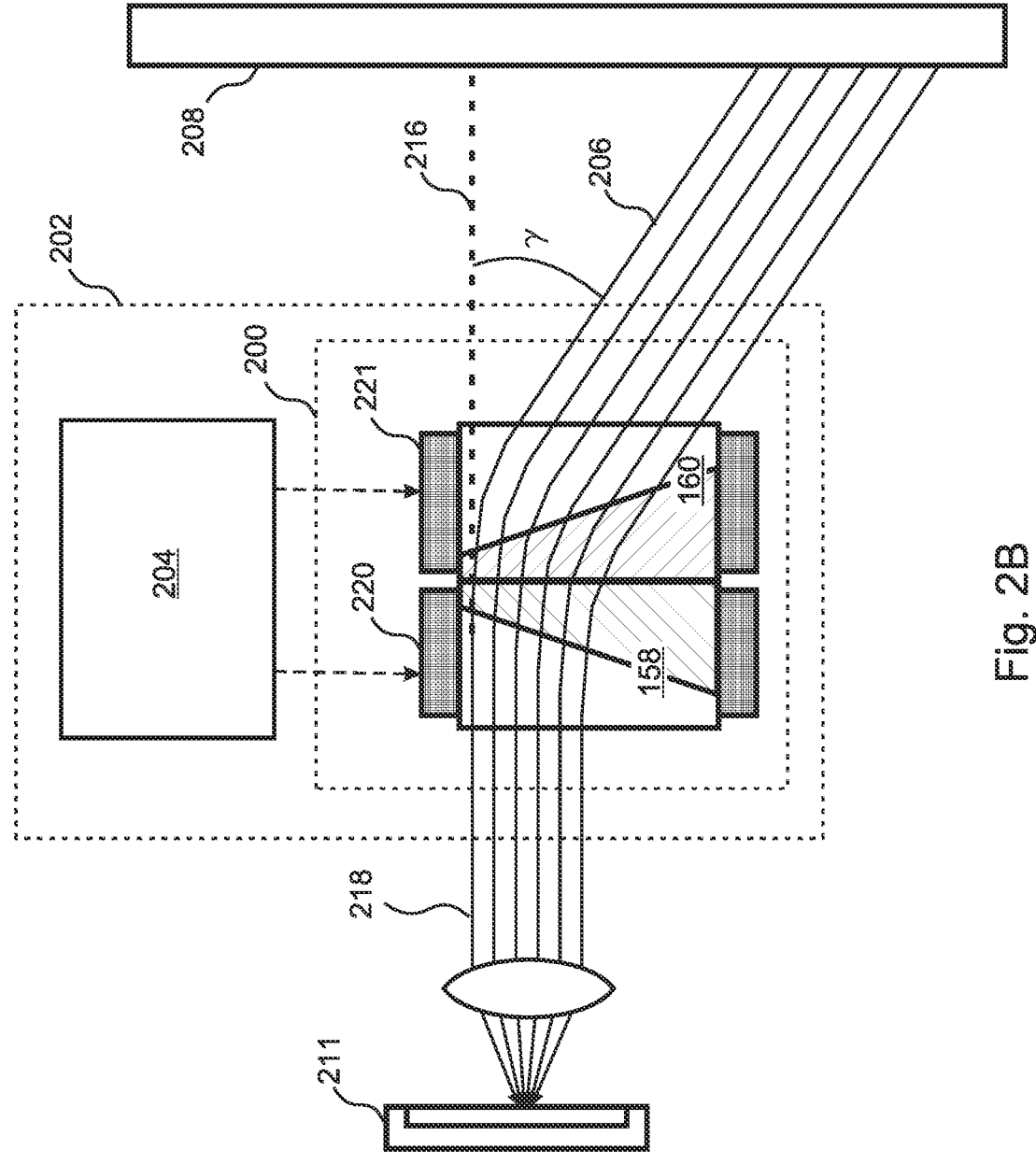
FIG. 2B is a block diagram of Risley prism pointing system according to an embodiment of the present disclosure in which the RPA selects a region or "frame" within a field of interest (FOI) and directs light from the selected frame to a high-resolution camera.

With reference to FIG. 2B, in other applications light 206 from a field of interest FOI 208 is directed by the RPA 200 to a camera 211. By rotating the prism elements 158, 160 of the RPA 200, the controller is able to select a region or "frame" within a field of interest (FOI) 208 to be directed to the camera 211. In one embodiment, the FOI 208 is an enemy encampment or airfield, and the camera 211 is a high resolution camera located in a satellite or on an unmanned aerial vehicle (UAV) or other aircraft.

Figure 2C:
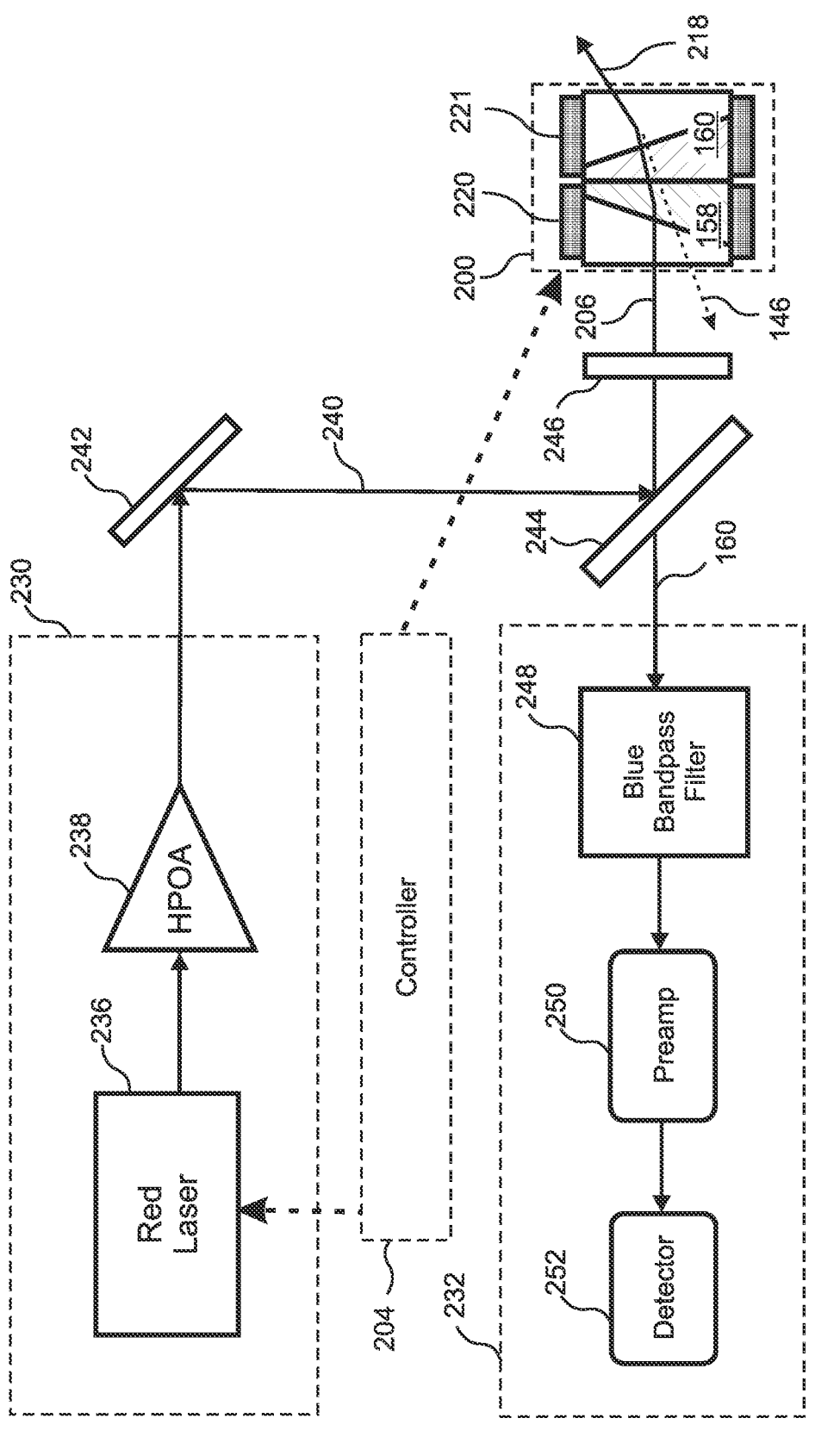
FIG. 2C is a block diagram of a Risley prism pointing system according to an embodiment of the present disclosure in which the RPA is included in a laser communication terminal.

With reference to FIG. 2C, in still other applications a Risley prism assembly 200 is implemented as part of a laser communication system. The illustrated example is a simplified block diagram of a "red" laser communication terminal that includes a transmitting section 230, a receiving section 232, and a controller 204. The message transmitting section 230 includes a "red" laser 236 and high-power optical amplifier (HPOA) 238 that generate a transmitted laser communication beam 240. In the illustrated example, the laser communication beam 240 is linear polarized, and the transmitted beam 240 is directed by a mirror 242 to a polarized beam splitter or dichroic filter 244 that functions as a transmit/receive diplexer (TX-RX diplexer), through a quarter wave plate 246 that converts the linear polarized beam into circular polarization, and then to the RPA 200, which directs the transmitted beam 218 to a remote node. "Blue" circular polarized light received from the remote node follows the same path in reverse through the RPA 200, being converted by the quarter wave plate 246 into linear polarized light that passes through the polarized beam splitter or dichroic filter 244 into the receiving section 232, which includes a blue bandpass filter 248, a preamplifier 250, and a light detector 252.

One of the disadvantages of an RPA 200 is that it is more likely to be affected by changes in temperature, as compared to a gimbal pointer 100. This is because the indices of refraction of the prism elements 158, 160 in an RPA 200, and hence the refraction angles of the prism elements 158, 160 will depend on the temperatures of the prisms 150, 152, 154, 156. This temperature dependence of the prisms 150, 152, 154, 156 can be compensated by the controller 204 of an RPA 200. However, for many applications, control of the pointing direction with sufficient accuracy requires that the temperature of each prism 150, 152, 154, 156 within each prism element 158, 160 must be accurately monitored in near real-time. Because the prism elements 158, 160 rotate, attachment of thermocouples to the prisms 150, 152, 154, 156 would require implementation of a slip ring or similar mechanism to transmit the electrical signals from the thermocouples through the rotating structure to the controller. However, a slip ring would increase the radial size of the RPA 200, which would not be acceptable for many applications, due to size and space constraints. Furthermore, for precision pointing applications, implementing a slip ring can introduce additional friction, which can lead to increased pointing jitter.

Figure 3A:
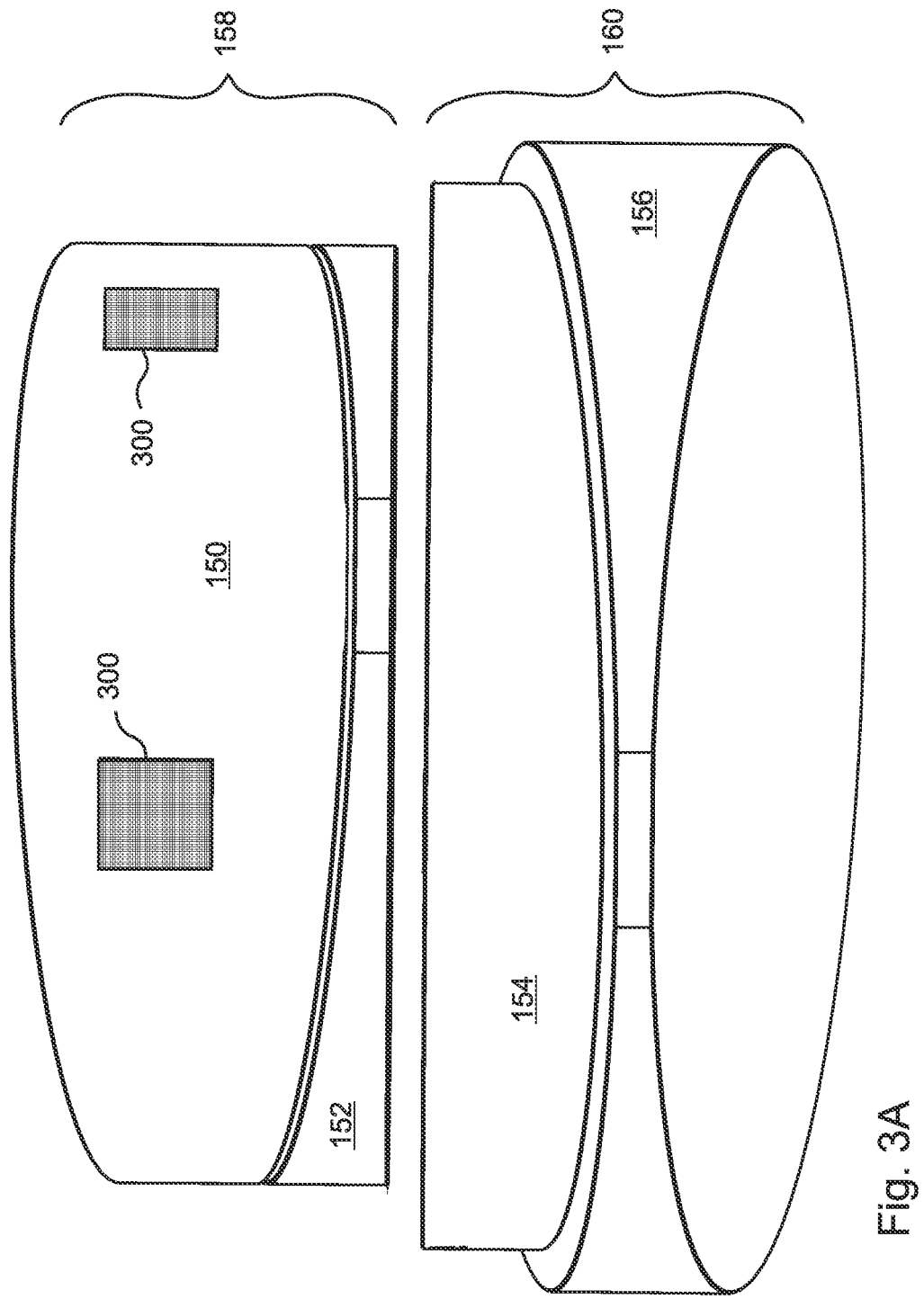
FIG. 3A is a side view, drawn to scale, of a pair of Risley prism elements having IR emissive patches applied thereto in an embodiment of the present disclosure.
Figure 3B:
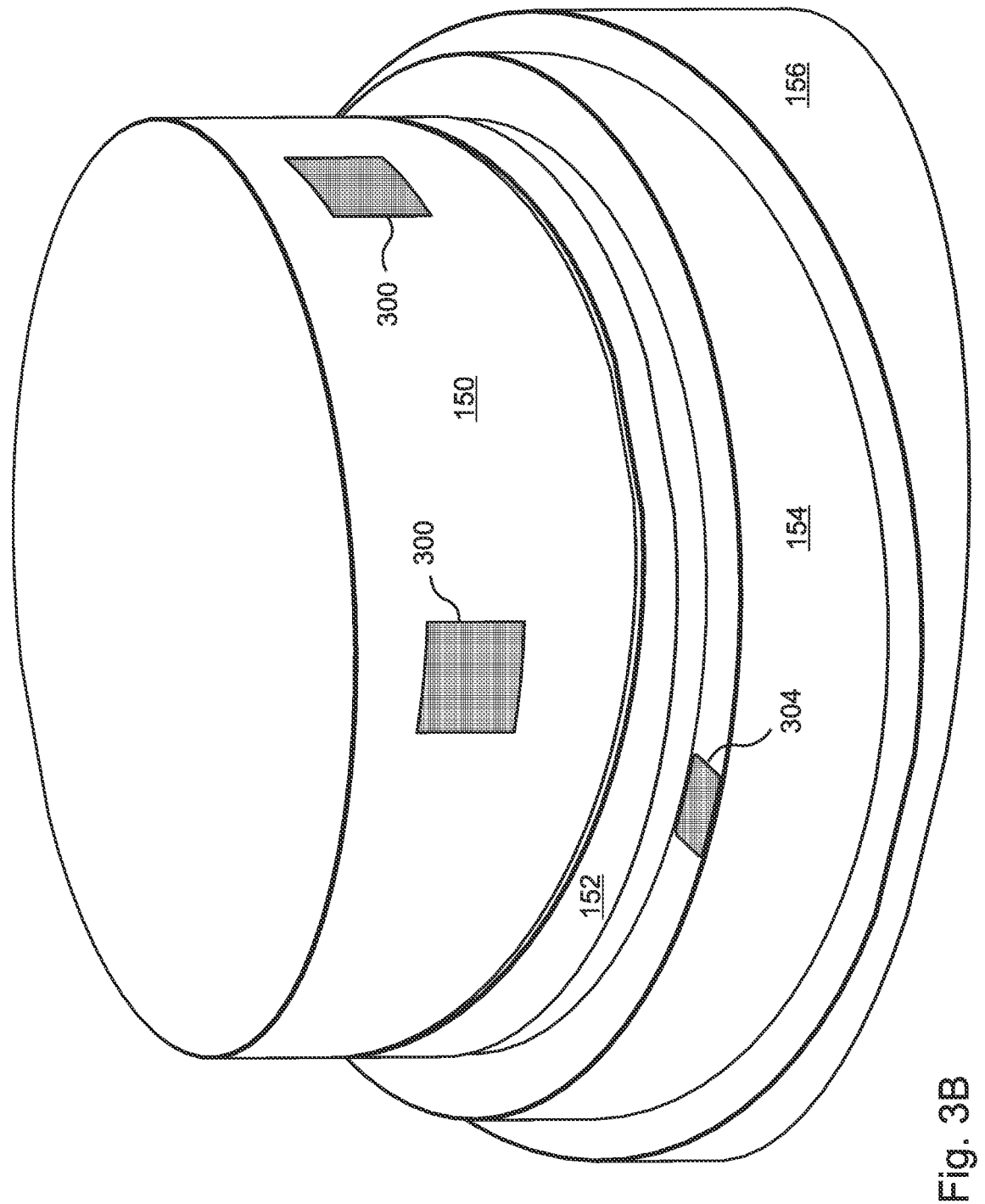
FIG. 3B is a perspective view from a first direction, drawn to scale, of the Risley prism elements of FIG. 3A.
Figure 3C:
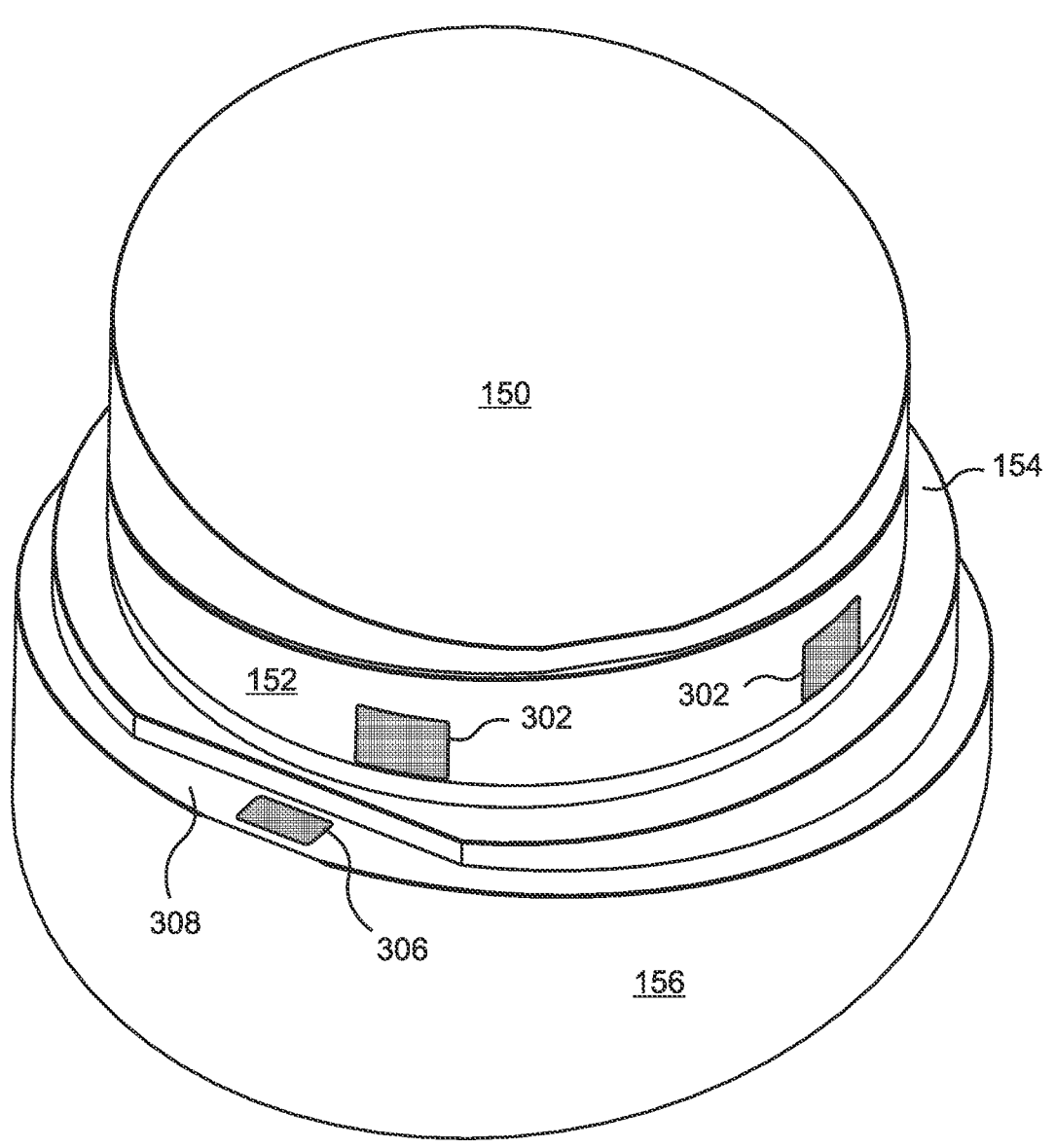
FIG. 3C is a perspective view from a second direction, drawn to scale, of the embodiment of FIG. 3A.
Figure 3D:
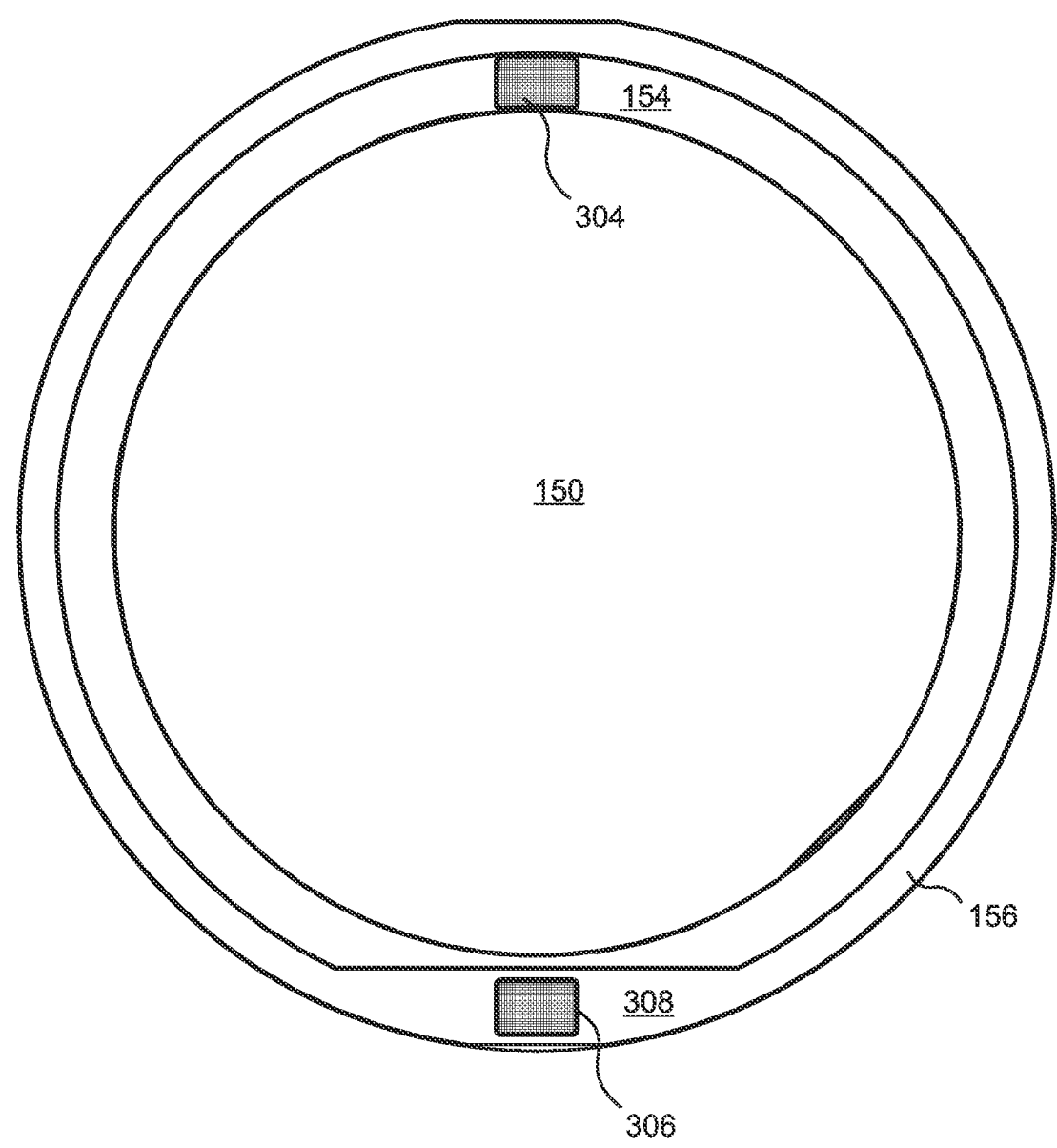
FIG. 3D is a top view, drawn to scale, of the embodiment of FIG. 3A.

FIG. 3A is a side perspective view, and FIGS. 3B and 3C are oblique perspective views of Risley prism elements 158, 160 included in an embodiment of the present disclosure, while FIG. 3D is a top view of the same Risley prism elements 158, 160. With reference to FIGS. 3A-3D, the disclosed temperature measurement system comprises at least one IR emissive "patch" 300, 302 located on a radially outward-facing surface of at least one of the prisms 150, 152 of one of the RPA prism elements 158, 160. The illustrated embodiment further includes at least one IR emissive patch 304, 306 located on the rear-facing surface of at least one of the prisms 154, 156 of one of the RPA prism elements 158, 160, and thereby oriented axially rearward (upward in FIGS. 3B-3D). In the illustrated embodiment, there are two radially orientated IR emissive patches 300, 302 on each of the first two prisms 150, 152, and one axially oriented IR emissive patch 304, 306 on each of the second two prisms 154, 156. It can be seen in FIGS. 3C and 3D that one of the prisms 154 includes a "cut-out" section 308 in a location that results in substantially no impact to the optical properties of the RPA, while providing more space for exposure of the axially directed IR emissive patch 306 that is applied to the underlying prism 156.

The IR emissive patches 300, 302, 304, 306 are configured to emit IR "black body" radiation according to the temperatures of the prisms 150, 152, 154. 156 to which they are applied. In embodiments, at least one IR emissive patch is applied to each of the rotatable prism elements 158, 160 of the RPA. In the illustrated embodiment, each of the rotatable prism elements 158, 160 includes a pair of prisms, and each of the prisms 150, 152, 154, 156 includes at least one IR emissive patch 300, 302, 304, 306 applied thereto. In embodiments, a plurality of IR emissive patches are applied to at least one of the prisms 150, 152, thereby reducing the time required to temporarily reorient the prism and obtain a temperature measurement, as described in more detail below.

The IR emissive patches 300, 302, 304, 306 are positioned to avoid being impacted by IR light passing through or arising from within the prisms 150, 152, 154, 156, so that they emit only black body radiation. In embodiments, the IR emissive patches 300, 302, 304, 306 are patches of IR emissive paint. They can be of any convenient shape. In the illustrated embodiment, they are substantially rectangular, while in other embodiments they are square, circular, and/or oval. In some embodiments, at least one of the IR emissive patches extends through a partial or complete annulus or band about a prism.

In embodiments, the IR emissivity of the IR emissive patches 300, 302, 304, 306 is greater than 70%, and in some embodiments greater than 80%, where the IR emissivity is defined as the ratio of the energy radiated by the patch to the energy that would be radiated by an ideal black body emitter (patch black body emission/ideal black body radiation) under the same conditions.

Figure 4A:
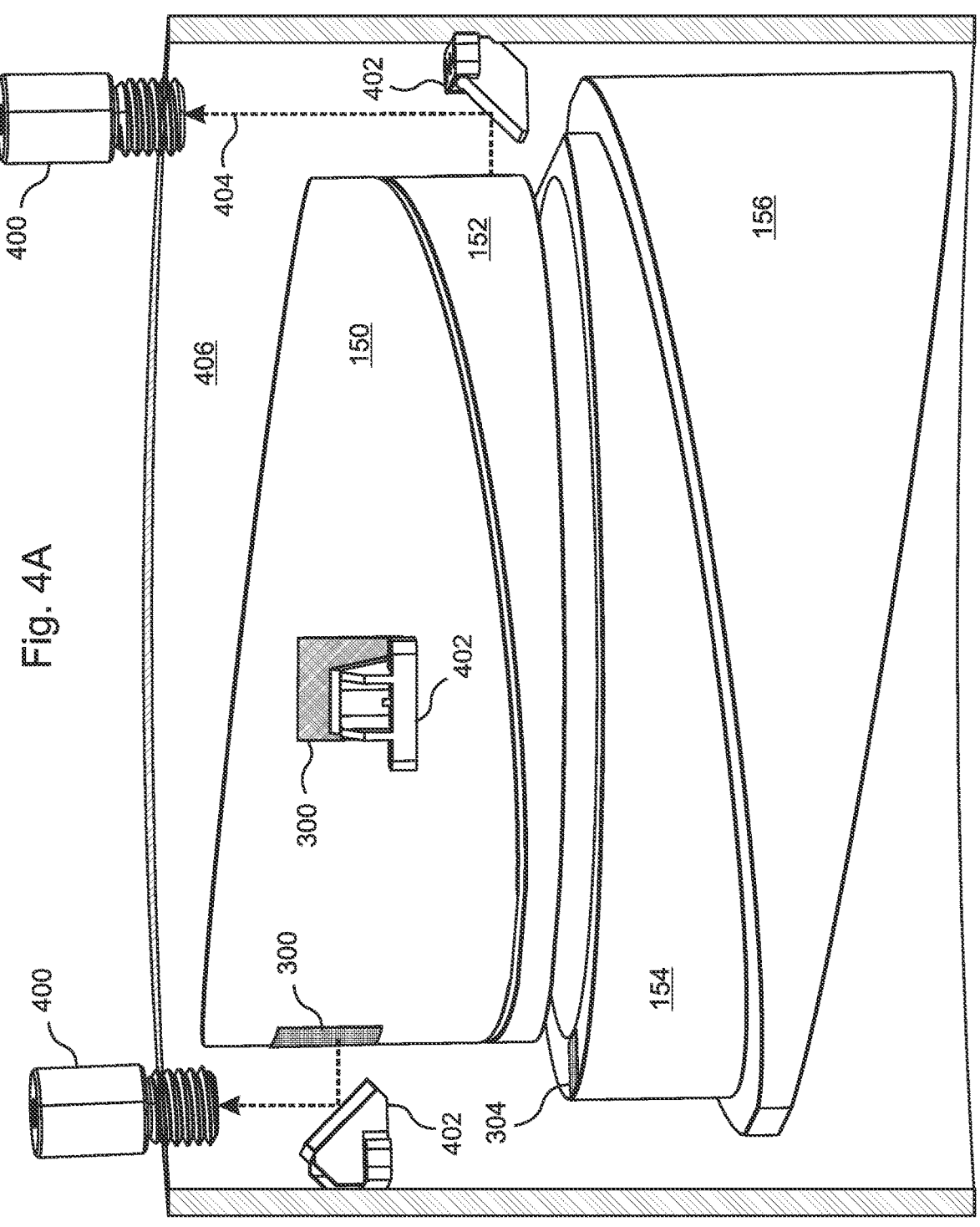
FIG. 4A is a perspective view from the side, drawn to scale except for element 406, of Risley prism elements, IR emissive patches, IR reflective surfaces, and IR detectors in an embodiment of the present disclosure.
Figure 4B:
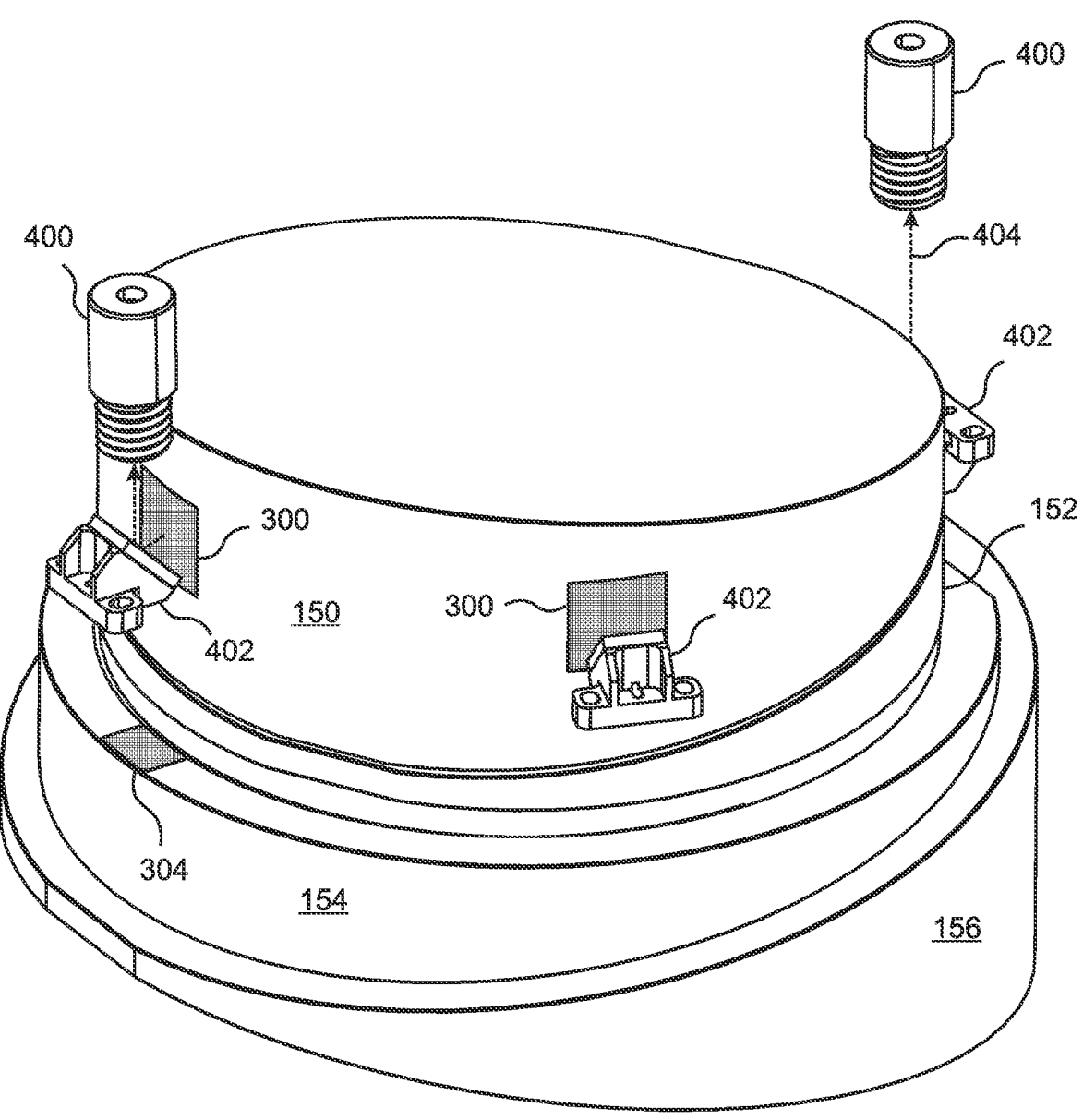
FIG. 4B is a perspective oblique view, drawn to scale, of the embodiment of FIG. 4A.

With reference to FIGS. 4A and 4B, the disclosed temperature measurement system comprises at least one infrared (IR) sensor 400 located axially behind the prisms 150, 152, 154, 156 of the Risley prism assembly (RPA) and directed axially toward the prisms 150, 152, 154, 156. It will be noted that the term "axially" as used herein refers to directions that are parallel to the rotational axis of the RPA prism elements, and that the term "axially behind" is used herein to describe an IR sensor 400 that is axially located on the light-emergent side of the RPA.

In embodiments, the one or more IR sensors 400 is/are offset from the rotational axis of the RPA by a distance that is slightly less than, or approximately equal to, a radius of the prism 156 of the RPA having the largest radius, which is referred to herein as the "largest" prism 156 of the RPA. In some of these embodiments, the at least one IR sensor 400 does not extend radially beyond the housing 406 of the RPA. In the illustrated embodiment, the IR sensors 400 are fixed to the housing 406, which is shown in sectional view in FIG. 4A, and omitted from the other figures, for clarity of illustration. The prism support rings (500, 502 in FIG. 5), which are fixed to the prisms 150, 152, 154, 156, have also been omitted from FIGS. 4A-4D.

The disclosed temperature sensing system further comprises an IR reflective surface 402 inclined at a 45-degree angle away from axial. The IR reflective surfaces 402 function essentially as "periscopes," in that they are configured to direct the radially emitted black body radiation 404 axially rearward. The IR reflective surfaces 402 in the illustrated embodiment of FIGS. 4A and 4B are fixed to the housing 406, and are in fixed, axial alignment with the IR sensors 400. Accordingly, detection of IR radiation 404 that has been reflected by an IR reflective surface 402 requires that one of the Risley prism elements 158, 160 be temporarily rotated to radially align with one of the IR emitting patches 300, 302, 304, 306 with the IR reflective surface 402. In embodiments, none of the IR reflective surfaces 402 extends radially beyond a diameter of the RPA housing 406. In the illustrated embodiment, none of the IR reflective surfaces 402 extends radially beyond the diameter of the largest RPA prism 156.

The disclosed temperature sensing system is configured to measure the temperatures of the prisms 150, 152, 154, 156 included in the prism elements 158, 160, by directing black body IR radiation 404 from the IR emissive patches 300, 302, 304, 306 to the one or more IR sensors 400. Black body IR radiation 404 emitted by the one or more IR emissive patches 300, 302 that are oriented radially outward is reflected to one or more of the IR sensors 400 by the one or more IR reflective surfaces 402. In the illustrated embodiment, the IR emissive patches 304, 306 are oriented axially rearward, and the light emitted thereby is directly received by one or more of the IR sensors 400.

Figure 4C:
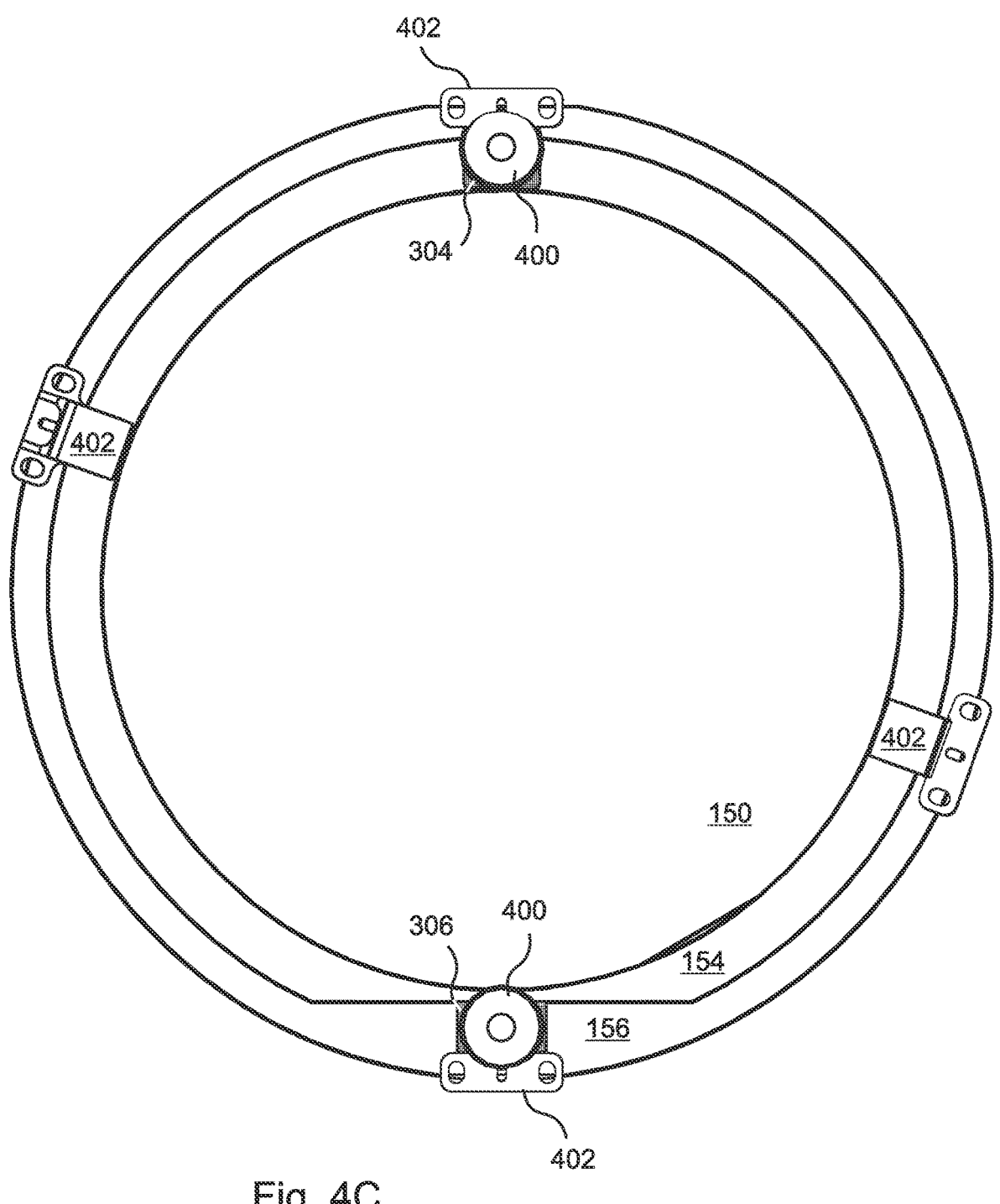
FIG. 4C is a top view, drawn to scale, of an embodiment similar to FIG. 4A in which the upper prism element has been rotated such that the IR sensors receive light reflected by the IR reflective surfaces from the radially aligned IR emissive patches attached to the upper two prisms.
Figure 4D:
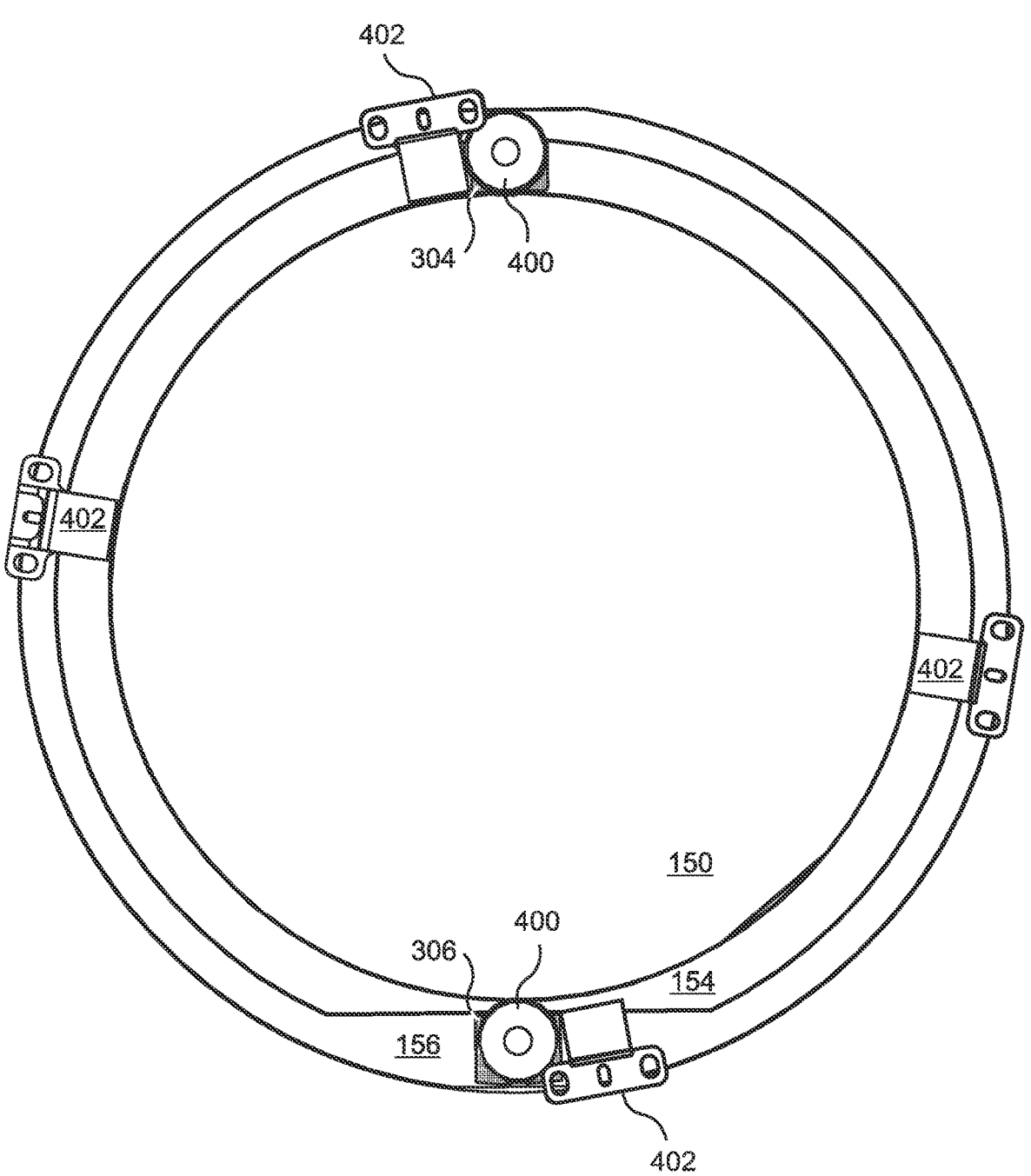
FIG. 4D is a top view, drawn to scale, of the embodiment of FIG. 4C in which the upper Risley prism element has been rotated to move the IR reflective surfaces attached thereto out of alignment with the IR sensors, and the lower Risley prism element has been rotated such that the IR sensors receive black body IR radiation directly from the axially aligned IR emissive patches attached to the two prisms of the lower Risley prism element.

In the embodiment of FIGS. 4C and 4D, the IR reflective surfaces 402 are attached to the prisms 150, 152, 154, 156 via the prism support rings (500, 502 in FIG. 5), and are in fixed radial alignment with the radially oriented IR emissive patches 300, 302. Accordingly, detection of IR radiation 404 that has been reflected by an IR reflective surface 402 requires that the associated prism element of the RPA must be temporarily rotated to axially align the associated IR reflective surface 402 with one of the IR sensors 400. In FIG. 4C, the upper prism element 158 has been rotated such that the IR sensors 400 receive reflected light from the radially aligned IR emissive patches 300, 302 attached to the upper two prisms 150, 152. In FIG. 4D, the upper prism element 158 has been rotated to move the IR reflective surfaces 402 out of alignment with the IR sensors 400, and the lower prism element 160 has been rotated such that the IR sensors 400 receive black body IR radiation directly from the axially aligned IR emissive patches 304, 306 that are attached to the lower two prisms 154, 156.

In some embodiments where the largest prism includes one or more IR emissive patches directed radially outward, at least one IR sensor 400 is located behind an associated IR reflective surface 402, and thereby slightly outside of the diameter of the largest prism, but nevertheless within a radius of the housing 406 of the RPA. In the illustrated embodiments, the largest prism 156 only includes an IR emissive patch 306 that is axially directed rearward, which allows all of the IR sensors to be located entirely behind the RPA prisms 150, 152, 154, 156.

Figure 5:
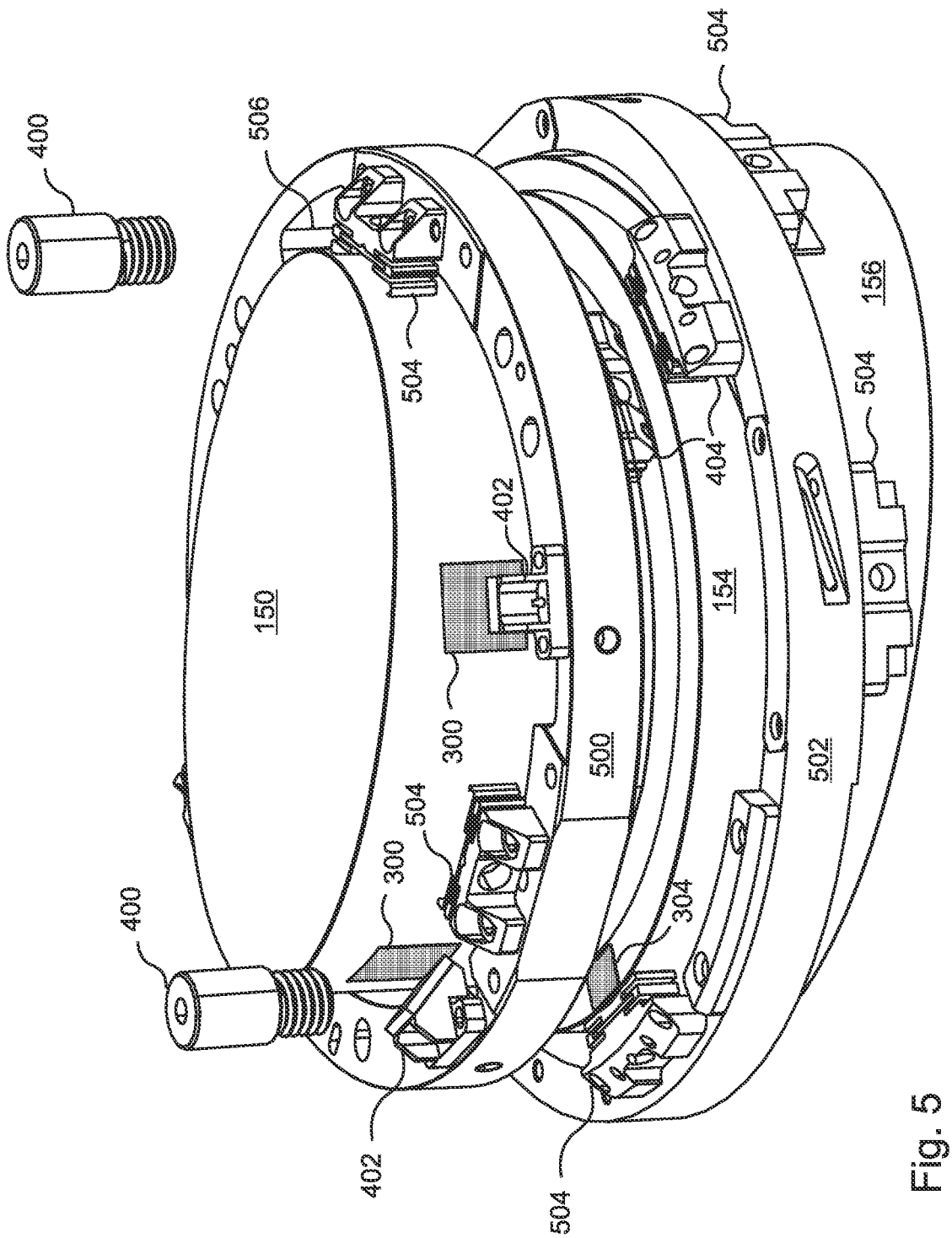
FIG. 5 is a perspective view of the embodiment of FIGS. 4C-4D, showing the prism support rings that support the Risley prism elements.

FIG. 5 is an oblique perspective view of the embodiment of FIGS. 3A-4D, showing the prism support rings 500, 502 that support the prisms 150, 152, 154, 156, with the IR reflective surfaces 402 attached thereto. In the illustrated embodiment, the upper two prisms 150, 152 form the upper Risley prism element 158 of the RPA, and are attached to an upper support ring 500 by brackets 504 that are fixed respectively to the top and bottom of the upper support ring 500. Similarly, the lower two prisms 154, 156 form the lower Risley prism element 160 of the RPA. They are attached to a lower support ring 502 by brackets 504 fixed respectively to the top and bottom of the lower support ring 502. Openings 506 are provided in the support rings 500, 502 where needed to allow black body radiation from the axially oriented IR emissive patches 304, 306 to pass through and be detected by the IR sensors 400.

In embodiments, sensing data that is generated by the IR sensors 400 is directed to the controller 204 that controls the rotations of the Risley prism elements 158, 160.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An apparatus comprising:
a first rotatable element, the first rotatable element being rotatable about a rotation axis within a fixed housing;
a first IR emissive patch applied to a radially outward facing surface of the first rotatable element, the first IR emissive patch being configured to emit first black body IR radiation radially outward from the first rotatable element;
a first IR reflective surface positioned such that when the first IR emissive patch is in radial alignment with the first IR reflective surface, the first black body IR radiation is reflected axially thereby;
a first IR sensor fixed to the housing and positioned axially behind the first rotatable element, the first IR sensor being configured to sense the axially reflected first black body IR radiation and to generate first sensing data therefrom when the first IR reflective surface is radially aligned with the first IR emissive patch and axially aligned with the first IR sensor; and
a controller configured to receive first sensing data from the first IR sensor and to determine therefrom a temperature of the first rotatable element.

2. The apparatus of claim 1, wherein the first IR reflective surface is fixed to the housing, the first IR reflective surface being in fixed axial alignment with the first IR sensor.

3. The apparatus of claim 1, wherein the first IR reflective surface is fixed to the first rotatable element, the first IR reflective surface being in fixed radial alignment with the first IR emissive patch.

4. The apparatus of claim 1, wherein the rotation of the first rotatable element is controlled by the controller.

5. The apparatus of claim 4, wherein the controller is configured to initiate a temperature measurement of the first rotatable element by rotating the first rotatable element until the first IR reflective surface is axially aligned with first IR sensor and radially aligned with the first IR emissive patch.

6. The apparatus of claim 1, further comprising at least one of:
a second IR emissive patch applied to the radially outward facing surface of the first rotatable element, the second IR emissive patch being configured to emit second black body IR radiation radially outward from the first rotatable element;
a second IR reflective surface positioned such that when either the first or second IR emissive patch is in radial alignment with the second IR reflective surface, the corresponding radially emitted first or second black body IR radiation is reflected axially thereby; and
a second IR sensor fixed to the housing and positioned axially behind the first rotatable element, the second IR sensor being configured to sense either the first or second axially reflected black body IR radiation when the first or second IR reflective surface is radially aligned with the first or second IR emissive patch and axially aligned with the second IR sensor;
and wherein the controller is configured to initiate the temperature measurement of the first rotatable element by rotating the first rotatable element until one of the first and second IR reflective surfaces is aligned axially with one of the first and second IR sensors and radially aligned with one of the first and second IR emissive patches.

7. The apparatus of claim 1, wherein the apparatus further comprises:
a second rotatable element that is rotatable about the rotation axis within the fixed housing;

a second IR emissive patch applied to an outward facing surface of the second rotatable element, the second IR emissive patch being configured to emit second black body IR radiation radially outward from the second rotatable element;
a second IR reflective surface positioned such that when the second IR emissive patch is in radial alignment with the second IR reflective surface, the second black body IR radiation is reflected axially thereby;
the apparatus being configured to generate second sensing data characterizing the second black body IR radiation; and
the controller being configured to receive the second sensing data and to determine therefrom a temperature of the second rotatable element.

8. The apparatus of claim 7, wherein the first and second IR reflective surfaces are fixed respectively to the first and second rotatable elements, the first and second IR reflective surfaces being radially positioned such that at a first orientation of the first and second rotatable elements the first IR sensor is able to sense the first black body IR radiation, and at a second orientation of the first and second rotatable elements the first IR sensor is able to sense the second black body IR radiation.

9. The apparatus of claim 7, further comprising a second IR sensor fixed to the housing and positioned axially behind the first and second rotatable elements, the second IR sensor being configured to sense the axially reflected second black body IR radiation when the second IR reflective surface is radially aligned with the second IR emissive patch and axially aligned with the second IR sensor.

10. The apparatus of claim 7, wherein:
a first diameter of the first rotatable element is greater than a second diameter of the second rotatable element; and
neither of the first and second IR reflective surfaces extends radially beyond the diameter of the first rotatable elements.

11. The apparatus of claim 1, further comprising:
a third rotatable element;
a third IR emissive patch applied to a rearward facing surface of the third rotatable element, the third IR emissive patch being configured to emit third black body IR radiation axially rearward from the third rotatable element; and
a third IR sensor configured to sense the axially emitted third black body IR radiation.

12. The apparatus of claim 11, wherein:
the first rotatable element is located between the third rotatable element and the third IR sensor; and
the first rotatable element includes a radially inward cutout configured to enable sensing of the third black body IR radiation by the third IR sensor when the radially inward cutout is axially aligned with the third IR emissive patch.

13. The apparatus of claim 1, wherein the first rotatable element is a prism element included in a Risley prism assembly.

14. A computer program product embodied on a non-transitory storage medium that is readable by a controller, the computer program product comprising instructions configured, when executed by the controller, to cause the controller to:
cause a first rotatable element of an apparatus to rotate about a rotation axis until a first IR reflective surface is radially aligned with a first IR emissive patch applied to a radially outward facing surface of the first rotatable element, and axially aligned with a first IR sensor fixed to a housing of the apparatus, thereby causing first black body IR radiation radially emitted by the first IR emissive patch to be axially reflected by the first IR reflective surface and sensed by the first IR sensor, first sensing data being generate therefrom by the first IR sensor;

receive the first IR sensing data from the first IR sensor; and determine a temperature of the first rotatable element according to the first IR sensing data.

15. The computer program product of claim 14, wherein the first IR reflective surface is fixed to the housing, the first IR reflective surface being in fixed axial alignment with the first IR sensor.

16. The computer program product of claim 14, wherein the first IR reflective surface is fixed to the first rotatable element, the first IR reflective surface being in fixed radial alignment with the first IR emissive patch.

17. The computer program product of claim 14, wherein the computer program product further comprises instructions configured, when executed by the controller, to cause the controller to initiate a temperature measurement of the first rotatable element by rotating the first rotatable element until the first IR reflective surface is axially aligned with first IR sensor and radially aligned with the first IR emissive patch.

18. The computer program product of claim 14, wherein the computer program product further comprises instructions configured, when executed by the controller, to cause the controller to:

cause a second rotatable element to rotate about the rotation axis until a second IR reflective surface is radially aligned with a second IR emissive patch applied to a radially outward facing surface of the second rotatable element, thereby causing second black body IR radiation radially emitted by the second IR emissive patch to be axially reflected by the second IR reflective surface and sensed by the apparatus, second sensing data being generate therefrom by the apparatus;

receive the second sensing data from the apparatus; and determine a temperature of the second rotatable element according to the second sensing data.

19. The computer program product of claim 18, wherein the black body IR radiation radially emitted by the second IR emissive patch and axially reflected by the second IR reflective surface is sensed by a second IR sensor fixed to the housing.

20. The computer program product of claim 14, wherein the first rotatable element is a prism element included in a Risley prism assembly.

* * * * *